| United States Patent [19] | [11] Patent Number: 4,540,754 |
|---|---|
| Kobashi et al. | [45] Date of Patent: Sep. 10, 1985 |

[54] PROCESS FOR PRODUCING HIGH MOLECULAR WEIGHT ACRYLONITRILE POLYMERS

[75] Inventors: Toshiyuki Kobashi; Shoyo Takagi, both of Okayama, Japan

[73] Assignee: Japan Exlan Company Limited, Osaka, Japan

[21] Appl. No.: 593,240

[22] Filed: Mar. 26, 1984

[30] Foreign Application Priority Data

Apr. 13, 1983 [JP] Japan .................................. 58-66243

[51] Int. Cl.³ ................................................. C08F 2/00
[52] U.S. Cl. .................................... 526/88; 526/202; 526/219.6; 526/219.5; 526/341; 526/342
[58] Field of Search ........................... 526/202, 342, 88

[56] References Cited

U.S. PATENT DOCUMENTS

| 3,201,375 | 8/1965 | Finestone et al. | 526/342 X |
| 3,962,196 | 6/1976 | Weimer et al. | 526/202 X |
| 4,197,400 | 4/1980 | Wollrab et al. | 526/342 X |
| 4,352,916 | 10/1982 | Landoll | 526/202 X |

FOREIGN PATENT DOCUMENTS 51-018779  2/1976  Japan .................................. 526/202

*Primary Examiner*—Joseph L. Schofer
*Assistant Examiner*—S. Babajko
*Attorney, Agent, or Firm*—Wenderoth, Lind & Ponack

[57] ABSTRACT

In the suspension polymerization of acrylonitrile in an aqueous medium, the polymerization is conducted in the presence of a water-soluble polymer and an oil soluble radical initiator while maintaining the acrylonitrile concentration higher than 9 weight percent in the polymerization system, whereby the polymerization of acrylonitrile in the water phase is suppressed and a high molecular weight polymer (weight average molecular weight not less than 400,000) having uniform particle diameters is produced.

9 Claims, No Drawings

PROCESS FOR PRODUCING HIGH MOLECULAR WEIGHT ACRYLONITRILE POLYMERS

BACKGROUND OF THE INVENTION (a) Field of the Invention

The present invention relates to a process for producing high molecular weight acrylonitrile (hereinafter referred to as AN) polymers, and more particularly it relates to a process for producing high molecular weight AN polymers by suspension polymerization of monomer composed mainly of AN in an aqueous medium wherein particular polymerization conditions are combined and the polymerization in the water phase is suppressed.

(b) Description of the Prior Art

The molecular weight of AN polymers used for the production of acrylic synthetic fibers is generally from 50,000 to 200,000. The methods of industrial production of such polymers are divided broadly into two categories: aqueous polymerization of monomer composed mainly of AN in the presence of a water-soluble polymerization initiator in an aqueous medium, and solution polymerization wherein the monomer is polymerized in an inorganic or organic solvent which can dissolve AN polymers.

In the meantime, in recent years, a study was commenced for obtaining high strength fibers by dissolving a high molecular weight AN polymer in an organic or inorganic solvent, spinning the solution, and highly stretching the resulting fibers, as required. But it has not yet been successful in finding a useful method which permits the production of an AN having a molecular weight not less than 40,000, on a industrial scale and effectively.

On a laboratory scale, it is possible to obtain a high molecular weight AN polymer by bulk polymerization in which AN monomer is heated together with a polymerization initiator which is soluble in this monomer; or by photo solution polymerization in which AN monomer is polymerized by irradiation with ultra violet ray in an inorganic or organic solvent which can dissolve the resulting AN polymer. But in bulk polymerization, the operation of polymerization is complicated, and moreover there is a problem in that the polymer characteristics are not uniform. Also, in photo solution polymerization, the production cost is high, and there is a difficulty in the enlargement of the production apparatus and in the removal of impurities contained in the polymerization solution. Furthermore, the process involves various difficulties such that there is a rise of solution viscosity with the increase of molecular weight. Therefore, these processes cannot be evaluated as industrial means.

On the other hand, it may be possible to take into consideration a suspension polymerization process of a high molecular weight AN polymer in an aqueous medium, using an oil-soluble initiator and a dispersion stabilizer. But at usual polymerization temperatures about 7% AN dissolves in water, so that besides the suspension polymerization which occurs in AN monomer drops, a polymerization also takes place in the AN dissolved in the water phase, with the progress of polymerization. Moreover, the latter polymer formed in the water phase has a lower molecular weight and smaller particle diameters in comparison with the former polymer formed in the monomer phase. Therefore, the final product is a mixture of the two kinds of polymers formed in the monomer phase and water phase. Accordingly, in the case of this polymerization process, there is also a problem in producing a high molecular weight AN polymer having uniform molecular weight and particle diameters. In the polymerization on an industrial scale, it is common knowledge to polymerize at a high polymerization yield as possible, in order to heighten the productivity of the production process. However, polymerization at a high polymerization yield by suspension polymerization for obtaining a high molecular weight AN polymer results in mixing the low molecular weight polymer polymerized in the water phase, thus making it impossible to obtain a high molecular weight polymer only.

SUMMARY OF THE INVENTION

Under such circumstances, we conducted research for useful means that will make it possible to obtain high molecular weight AN polymers in an industrial manner. As a result, we have found that, in suspension polymerization of AN in an aqueous medium in the process of a water-soluble polymer and an oil-soluble initiator, when the polymerization is conducted while maintaining a monomer concentration higher than a specific concentration in the polymerization system, it is possible to suppress the polymerization of AN in the water phase, and to produce, in an industrially advantageous manner, a high molecular weight AN polymer with uniform particle diameters, substantially by suspension polymerization.

An object of the present invention is to provide an industrially advantageous process for producing a high molecular weight AN polymer. Another object is to provide a process for producing a high molecular weight AN polymer which can provide high strength acrylic shaped products such as fibers, films, etc.

The high molecular weight AN polymer according to the present invention for attaining such objects and having a weight average molecular weight not less than 400,000 can be advantageously obtained suspension polymerization of AN alone or a monomer mixture composed of more than 85 weight % AN and at least one other ethylenic unsaturated compound which forms the remainder, in an aqueous medium containing a water-soluble polymer, while using an oil-soluble radical initiator and under the condition that more than 9 weight % monomer is maintained in the polymerization system.

DETAILED DESCRIPTION OF PREFERRED EMBODIMENT

In order to obtain the high molecular weight AN polymer under such specific polymerization conditions, it is essential to suppress the above-mentioned water phase polymerization. It is necessary to take out the AN polymer formed substantially in monomer drops in such a state that the AN dissolved in the water phase does not substantially polymerize, in other words, in such a state that an AN concentration higher than the solubility of AN in the water phase is maintained in the polymerization system.

The suspension polymerization to obtain a high molecular weight AN polymer according to the present invention is applied to the polymerization of AN alone or a monomer mixture composed of more than 85 weight % AN and at least one other ethylenically unsaturated monomer which forms the remainder. Said other ethylenically unsaturated monomers, which are the copolymerization components, are unsaturated compounds known per se which are copolymerizable with AN. For example they include vinyl halides and vinylidene halides such as vinyl chloride, vinyl bromide, vinylidene chloride, etc.; unsaturated carboxylic acids such as acrylic acid, methacrylic acid, maleic acid, itaconic acid, etc. and their salts; acrylic acid esters such as methyl acrylate, ethyl acrylate, butyl acrylate, octyl acrylate, methoxyethyl acrylate, phenyl acrylate, cyclohexyl acrylate, etc.; methacrylic acid esters such as methyl methacrylate, ethyl methacrylate, butyl methacrylate, octyl methacrylate, methoxyethyl methacrylate, phenyl methacrylate, cyclohexyl methacrylate, etc.; unsaturated ketones such as methyl vinyl ketone, methyl phenyl ketone, methyl isopropenyl ketone, etc.; vinyl esters such as vinyl formate, vinyl acetate, vinyl propionate, vinyl butyrate, vinyl benzoate, etc.; vinyl ethers such as methyl vinyl ether, ethyl vinyl ether, etc.; acrylic amide and its alkyl substituted compounds; unsaturated sulfonic acids such as vinylsulfonic acid, allylsulfonic acid, methallylsulfonic acid, p-styrenesulfonic acid, etc. and their salts; styrenes and their alkyl- or halogen-substituted compounds such as styrene, α-methylstyrene, chlorostyrene, etc.; allylalcohol and its esters and ethers; basic vinyl compounds such as vinylpyridine, vinylimidazole, dimethylaminoethyl methacrylate, etc.; vinyl compounds such as acrolein, methacrolein, vinylidene cyanide, glycidyl methacrylate, methacrylonitrile, etc.

The water-soluble polymers used in the present invention are dispersion stabilizers used when AN is suspension-polymerized in water as the medium. Also, they prevent the adhesion of polymer to the inner wall of the reaction vessel or to the stirrer wings, which frequently causes problems in AN suspension polymerization in which an oil-soluble initiator is used. Moreover, they fulfil the role of preventing polymer particles from agglomeration due to the adhesion of the particles. In addition, they can be easily removed from the polymer obtained by washing.

As such water-soluble polymers may be mentioned water-soluble celluloses such as methyl cellulose, ethyl cellulose, carboxymethyl cellulose, hydroxyethyl cellulose, etc.; polyvinyl pyrrolidone, polyacrylamide, polyethylene oxide, polyacrylic acid and its salts, polymethacrylic acid and its salts; sulfonic acid-containing monomers such as styrenesulfonic acid or sulfopropyl methacrylate and their salts; water-soluble copolymers of sulfonic acid- or carboxylic acid-containing monomers, and their salts; polyvinyl alcohol, etc. Among others, the use of polyvinyl alcohol (hereinafter referred to as PVA) is preferable, and the use of partially saponified PVA having a degree of saponification of 85 to 95% gives especially desirable polymerization results. Of course, two or more kinds of the above-mentioned water-soluble polymers may be used in combination. For the attainment of the objects of the present invention, it is desirable that the amount of such a water-soluble polymer to be used should be set within the range of from 0.5 to 3%, based on the total weight of the monomer.

In the present invention, it is recommended that the monomer concentration should be as high as possible because the high molecular weight polymer can be obtained easily. The ratio monomer/water in the polymerization vessel is desirably more than 1/6 by weight. A ratio monomer/water less than 1/6 by weight is not desirable because, in the present invention in which a monomer concentration higher than 9 weight % is maintained in the polymerization system, such a ratio causes an extreme reduction of productivity. The condition under which a monomer concentration higher than 9 weight % is maintained in the polymerization system, is such a condition that the AN monomer is dissolved in a supersaturated state in the water phase of the polymerization system and dispersed. When the monomer concentration in the polymerization system is less than 9 weight %, low molecular weight polymers are produced owing to the polymerization of the monomer dissolved in the water phase. Therefore such a monomer concentration is undesirable. To maintain a monomer concentration higher than 9 weight % in the polymerization system, in batch-type polymerization, the operator, while observing the progress of polymerization time and polymerization yield after the start of the polymerization, stops the reaction in a state in which more than 9 weight % monomer still remains in the polymerization system. In continuous polymerization, the polymerization is conducted while the monomer is supplied to the polymerization vessel in the above-mentioned monomer/water ratio, and the polymer is continuously removed from the polymerization vessel in a state in which more than 9 weight % monomer still remains in the polymerization vessel.

As preferred examples of the oil-soluble radical initiators used in the present invention, the following azo compounds or organic peroxides may be mentioned:

Azo compounds such as 2,2'-azobisisobutyronitrile; 2,2'-azobis(2-methylvaleronitrile); 2,2'-azobis(2,4-dimethylbutyronitrile); 2,2'-azobis(2-methylcapronitrile); 2,2'-azobis(2,3,3-trimethylbutyronitrile); 2,2'-azobis(2,4,4-trimethylvaleronitrile); 2,2'-azobis(2,4-dimethylvaleronitrile); 2,2'-azobis(2,4-dimethyl-4-ethoxyvaleronitrile); 2,2'-azobis(2,4-dimethyl-4-n-butoxyvaleronitrile), etc.

Organic peroxides such as acetyl peroxide, propionyl peroxide, isobutyl peroxide, octanoyl peroxide, decanoyl peroxide, lauryl peroxide, 3,5,5-trimethylhexanoyl peroxide, benzoyl peroxide, diacyl peroxides such as diisopropyl peroxydicarbonates, di-2-ethylhexyl peroxydicarbonate; peroxyesters such as t-butyl peroxyisobutylate, t-butyl peroxypivalate, t-butyl peroxyneodocanoate, t-butyl peroxylaurate; etc.

Of course, it is possible to use a suitable combination of two or more kinds of the above-mentioned oil-soluble radical initiators. Among others, azo compounds are preferred from the viewpoint of safety in handling and performance, and especially preferred is 2,2'-azobisisobutyronitrile or 2,2'-azobis(2,4-dimethylvaleronitrile.

As regards the amount of the oil-soluble radical initiators to be used necessary for obtaining an AN polymer of the present invention having a weight average molecular weight not less than 400,000, it depends on the performance of the oil-soluble initiator, monomer composition and concentration, polymerization conditions such as polymerization temperature, rate of stirring, etc. Therefore, there is no particularly limited value. However, 0.5–2.5% for 2,2'-azobisisobutyronitrile and 0.1–0.5% for 2,2'-azobis(2,4-dimethylvaleronitrile) are suitable. In order to obtain an acrylonitrile polymer having a weight average molecular weight higher than 1,000,000, 0.2–1.5% for 2,2'-azobisisobutyronitrile and 0.02–0.3% for 2,2'-azobis(2,4-dimethylvaleronitrile) are suitable.

In suspension polymerization, in order to hold the polymerization in a stable state, it is necessary to keep the effect of stirring suitably. If the effect of stirring is insufficient, polymer particles are not dispersed sufficiently and they agglomerate or the polymer adheres to the inner wall of the polymerization vessel. Therefore it becomes impossible to maintain the regular polymerization state.

On the contrary, if the stirring is too strong, there will be a drop in the molecular weight and polymerization yield. Therefore too strong stirring is undesirable not only for obtaining a high molecular weight polymer but also it causes an increase in the energy cost required for stirring.

From such a viewpoint, it is suitable that the stirring speed should be regulated so that the power required for stirring will be 1–10 KWH/m$^3$, more preferably 1.5–6 KWH/m$^3$ for the volume of the reaction system. As for the shape of the stirrer a, paddle or turbine type is suitable.

Although the polymerization temperature has a great influence on the molecular weight it should be determined in consideration of the kind of the radical initiator, the level of molecular weight, polymerization yield, etc., so that it is difficult to limit it definitely. However, in the production on an industrial scale, it is desirable to employ a temperature range from 20° to 80° C., preferably from 40° to 70° C.

Thus, by the suspension polymerization of AN monomer under the particular conditions, the polymerization of the monomer dissolved in the water phase is suppressed and it has become possible to produce a polymer substantially polymerized in the monomer drops and having a weight average molecular weight higher than 400,000, preferably higher than 1,000,000, on an industrial scale and advantageously. This has made it possible to produce polymers for the production of high strength shaped products such as acrylic fibers or films.

In the following, the present invention will be explained in further detail by way of Examples. However, it is to be understood that the present invention is by no way limited for its scope by the description of these Examples. In the Examples, percentages are by weight unless otherwise indicated.

The molecular weights described in the following Examples are the weight average molecular weights measured and calculated by the following method, as described in Journal of Polymer Science (A-1) Vol. 6, pp 147–159 (1968):

Weight average molecular weight: The polymer is dissolved in dimethylformamide (DMF) and its intrinsic viscosity number [$\eta$] is measured and the weight average molecular weight is calculated from the following formula:

$$[\eta] = 3.35 \times 10^{-4} M^{0.72}.$$

EXAMPLE 1

AN and methyl acrylate were copolymerized in a glass flask, 5 liters in capacity, equipped with paddle-type stirrer having a torque meter. Fifteen (15) grams of a partially saponified PVA (degree of saponification: 87%; degree of polymerization: 2000) was dissolved in 3000 g deionized water, and the solution was put into the flask. The flask was immersed in a warm water bath and was heated. When the temperature of the content reached 60° C., a monomer mixture of 900 g AN and 100 g methyl acrylate in which 10 g azobisisobutyronitrile was dissolved, was charged to initiate the polymerization. The reaction was continued for two hours while the polymerization system was stirred at a rotation of 450 r.p.m. and the reaction temperature was controlled at 60° C. The torque applied to the stirrer at this time was 1.6 kg.cm, from which the force required for stirring was calculated to be 1.85 KWH/m$^3$. After the termination of the reaction, the polymerized liquid was filtered and washed with water. There was no clogging of the filter cloth or no turbidity of the filtrate. A polymer of uniform particle diameters was obtained. The polymer was dried and the weight of the polymer after drying was found to be 575 g. The weight average molecular weight of the thus-obtained polymer was 1,350,000. The polymer could be easily dissolved in DMF and gave a clear polymer solution.

On the other hand, when the polymerization was conducted in the same way as above except that PVA was not added, the resulting polymer adhered to the stirrer in the form of an agglomerate, and the reaction ran away and the reaction liquid spouted out of the reaction vessel.

When the reaction was conducted under the same condition as above with PVA added, except that the stirring rate was lowered to 350 r.p.m. (the power required for stirring: 0.87 KWH/m$^3$), the resulting polymer adhered to the reaction vessel wall in the form of layers. A runaway reaction took place at this place, the adhering matter separated explosively and scattered, and the polymerization liquid spouted out of the reaction vessel. Therefore it was impossible to carry out the polymerization operation stably.

EXAMPLE 2

Suspension polymerization of AN alone was conducted with the same reaction apparatus and by the same method as described in Example 1. As the polymerization initiator, 2,2'-azobis(2,4-dimethylvaleronitrile) was added in an amount of 0.1% based on the AN monomer. The stirring rate was 450 r.p.m. (the power required for stirring: 1.85 KWH/m$^3$). The polymerization temperature was 60° C. (As the water-soluble polymer, the same PVA as used in Example 1 was used, which was added in an amount of 1.5% based on the monomer.) Other polymerization conditions and the polymerization results are as follows:

|  | Present invention | | | | Comparative examples | |
| --- | --- | --- | --- | --- | --- | --- |
| Ratio monomer/water | 1/1.5 | 1/2.33 | 1/3 | 1/4 | 1/6 | 1/8 |
| Polymerization time (hours) | 3 | 3 | 3 | 3 | 3 | 6 |
| Polymerization yield (%) | 73 | 66 | 62 | 51 | 48 | 80 |
| Molecular weight × 10$^{-4}$ | 142 | 138 | 135 | 128 | 120 | 125 |
| Experiment no. | 1 | 2 | 3 | 4 | 5 | 6 |

The polymers of Experiment nos. 3 to 6 were wet-spun, with an aqueous solution of sodium thiocyanate as the solvent. The results of measurement of the tensile strength of the fibers obtained are shown in the Table below:

| Experiment no. | 3 | 4 | 5 | 6 |
| --- | --- | --- | --- | --- |
| Tensile strength, g/d | 17.5 | 17.3 | 12.8 | 13.2 |

From the above results, it is understood that fibers having excellent strength can be obtained by using the high molecular weight AN polymers of the present invention.

What is claimed is:

1. A method of producing a high molecular weight acrylonitrile polymer having a weight average molecular weight not less than 400,000, characterized by suspension-polymerizing at a temperature of from 20° to 80° C., acrylonitrile alone or a monomer mixture compound of more than 85 weight % acrylonitrile and at least one other ethylenically unsaturated monomer which forms the remainder, in an aqueous medium containing a water-soluble polymer and an oil-soluble radical initiator, under the conditions that an acrylonitrile concentration higher than 9 weight % is maintained in the polymerization system, and wherein the effect of stirring imparted to the polymerization system is 1–10 KWH/m$^3$ in terms of the power required for stirring.

2. The method as claimed in claim 1 wherein an azo compound is used as the oil-soluble radical initiator.

3. The method as claimed in claim 1 wherein polyvinyl alcohol is used as the water-soluble polymer.

4. The method as claimed in claim 2 wherein 2,2'-azobisisobutyronitrile or 2,2'-azobis(2,4-dimethylvaleronitrile) is used as the azo compound.

5. The method as claimed in claim 3 wherein as the polyvinyl alcohol, a partially saponified polyvinyl alcohol having a degree of saponification of from 85 to 95% is used.

6. The method as claimed in claim 1 wherein the weight average molecular weight of the polymer is more than 1,000,000.

7. The method as claimed in claim 1 wherein the water-soluble polymer is maintained in the polymerization system in an amount of 0.5–3% based on the total monomer weight.

8. The method as claimed in claim 4 wherein 0.5–2.5% 2,2'-azobisisobutyronitrile or 0.1–0.5% 2,2'-azobis(2,4-dimethylvaleronitrile) based on the total monomer weight is used.

9. The method as claimed in claim 8 wherein 0.2–1.5% 2,2'-azobisisobutyronitrile or 0.02–0.3% 2,2'-azobis(2,4-dimethylvaleronitrile) based on the total monomer weight is used.

* * * * *